(12) United States Patent
Conlon et al.

(10) Patent No.: US 6,411,313 B1
(45) Date of Patent: Jun. 25, 2002

(54) USER INTERFACE FOR CREATING A SPREADSHEET PIVOTTABLE

(75) Inventors: Thomas P. Conlon; Paul A. Hagger, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/332,720

(22) Filed: Jun. 14, 1999

(51) Int. Cl.[7] .................................................. G06F 3/00
(52) U.S. Cl. ........................ 345/769; 345/840; 707/503
(58) Field of Search ................................. 345/700, 762, 345/764, 765, 769, 770, 781, 788, 799, 810, 835, 840, 856, 859, 860, 866; 707/503, 504

(56) References Cited

U.S. PATENT DOCUMENTS

| | | | | |
|---|---|---|---|---|
| 5,317,686 A | * | 5/1994 | Salas et al. ................. | 707/503 |
| 5,416,895 A | * | 5/1995 | Anderson et al. .......... | 707/503 |
| 5,623,282 A | * | 4/1997 | Graham et al. ............. | 345/672 |
| 6,246,410 B1 | * | 6/2001 | Bergeron et al. ........... | 345/854 |
| 6,298,342 B1 | * | 10/2001 | Graefe et al. ............... | 707/4 |

OTHER PUBLICATIONS

Desmarais, "Using the Microsoft Excel Pivot Table for Reliability Applications", IEEE 34th Spring Reliability Symposium, 1996, pp. 79–91.*

Microsoft Corporation. *Getting Results with Microsoft® Office 97.* "Create a Sales Summary." ©1995–1997 Microsoft Corporation. pp. 563–580.

* cited by examiner

*Primary Examiner*—Crescelle N. dela Torre
(74) *Attorney, Agent, or Firm*—Ronald M. Anderson

(57) ABSTRACT

A drag-and-drop form displayed directly on a spreadsheet enables a user to drag-and-drop fields to create a PivotTable data display directly on the spreadsheet. Fields of data selected by a user are displayed within a field well (an array) included with a PivotTable Button Bar. The user can select a field with a mouse, drag the selected field over a desired region, and drop the field to insert it in the desired region. The drag-and-drop form identifies a page region, a row region, a column region, and a data region on the spreadsheet. If the data is of the OLAP type, the field well also includes icons indicating whether the fields in rows to the right of the icons are of the dimension type or the measure type. Since the PivotTable Button Bar is optionally displayed on the spreadsheet at all times, the user can readily add a selected field to one of the regions of the PivotTable data display by dragging and dropping the selected field. Changes can also be made to a PivotTable data display by dragging fields within a region or between different regions. Changes in the cursor shape indicate a portion of the PivotTable data display over which a field is currently being dragged.

26 Claims, 8 Drawing Sheets

| | A | B | C | D | E | F | G |
|---|---|---|---|---|---|---|---|
| 1 | Country | Region | State | Product Line | Unit | Revenue | Expenses |
| 2 | USA | NE | MA | Clothes | shoes | 1000000 | 40 |
| 3 | USA | NE | CT | Clothes | shoes | 44 | 40 |
| 4 | USA | NW | WA | Clothes | shoes | 25 | 20 |
| 5 | USA | NW | OR | Clothes | shoes | 30 | 29 |
| 6 | Canada | E | PQ | Clothes | shoes | 50 | 45 |
| 7 | Canada | E | ON | Clothes | shoes | 99 | 90 |
| 8 | Canada | W | BC | Clothes | shoes | 88 | 80 |
| 9 | Canada | W | AL | Clothes | shoes | 40 | 20 |
| 10 | USA | NE | MA | Food | pasta | 60 | 20 |
| 11 | USA | NE | CT | Food | pasta | 45 | 44 |
| 12 | USA | NW | WA | Food | pasta | 33 | 22 |
| 13 | USA | NW | OR | Food | pasta | 50 | 20 |
| 14 | Canada | E | PQ | Food | pasta | 50 | 49 |
| 15 | Canada | E | ON | Food | pasta | 60 | 50 |
| 16 | Canada | W | BC | Food | pasta | 90 | 88 |
| 17 | Canada | W | AL | Food | pasta | 44 | 39 |
| 18 | USA | NE | MA | Clothes | pants | 80 | 20 |
| 19 | USA | NE | CT | Clothes | pants | 33 | 33 |
| 20 | USA | NW | WA | Clothes | pants | 22 | 21 |
| 21 | USA | NW | OR | Clothes | pants | 20 | 30 |
| 22 | Canada | E | PQ | Clothes | pants | 55 | 44 |
| 23 | Canada | E | ON | Clothes | pants | 98 | 91 |
| 24 | Canada | W | BC | Clothes | pants | 81 | 81 |
| 25 | Canada | W | AL | Clothes | pants | 44 | 43 |
| 26 | USA | NE | MA | Food | milk | 60 | 25 |
| 27 | USA | NE | CT | Food | milk | 44 | 40 |
| 28 | USA | NW | WA | Food | milk | 33 | 22 |
| 29 | USA | NW | OR | Food | milk | 55 | 11 |
| 30 | Canada | E | PQ | Food | milk | 44 | 40 |
| 31 | Canada | E | ON | Food | milk | 66 | 55 |
| 32 | Canada | W | BC | Food | milk | 95 | 87 |
| 33 | Canada | W | AL | Food | milk | 49 | 41 |
| 34 | | | | | | | |

*FIG. 1A*

| Country | Region | State | Data | Product Line | | Grand Total |
|---|---|---|---|---|---|---|
| | | | | Clothes | Food | |
| Canada | E | ON | Sum of Revenue | 197 | 126 | 323 |
| | | | Sum of Expenses | 181 | 105 | 286 |
| | | PQ | Sum of Revenue | 105 | 94 | 199 |
| | | | Sum of Expenses | 89 | 89 | 178 |
| | E Sum of Revenue | | | 302 | 220 | 522 |
| | E Sum of Expenses | | | 270 | 194 | 464 |
| | W | AL | Sum of Revenue | 84 | 93 | 177 |
| | | | Sum of Expenses | 63 | 80 | 143 |
| | | BC | Sum of Revenue | 169 | 185 | 354 |
| | | | Sum of Expenses | 161 | 175 | 336 |
| | W Sum of Revenue | | | 253 | 278 | 531 |
| | W Sum of Expenses | | | 224 | 255 | 479 |
| Canada Sum of Revenue | | | | 555 | 498 | 1053 |
| Canada Sum of Expenses | | | | 494 | 449 | 943 |
| USA | NE | CT | Sum of Revenue | 77 | 89 | 166 |
| | | | Sum of Expenses | 73 | 84 | 157 |
| | | MA | Sum of Revenue | 1000080 | 120 | 1000200 |
| | | | Sum of Expenses | 60 | 45 | 105 |
| | NE Sum of Revenue | | | 1000157 | 209 | 1000366 |
| | NE Sum of Expenses | | | 133 | 129 | 262 |
| | NW | OR | Sum of Revenue | 50 | 105 | 155 |
| | | | Sum of Expenses | 59 | 31 | 90 |
| | | WA | Sum of Revenue | 47 | 66 | 113 |
| | | | Sum of Expenses | 41 | 44 | 85 |
| | NW Sum of Revenue | | | 97 | 171 | 268 |
| | NW Sum of Expenses | | | 100 | 75 | 175 |
| USA Sum of Revenue | | | | 1000254 | 380 | 1000634 |
| USA Sum of Expenses | | | | 233 | 204 | 437 |
| Total Sum of Revenue | | | | 1000809 | 878 | 1001687 |
| Total Sum of Expenses | | | | 727 | 653 | 1380 |

*FIG. 1B*

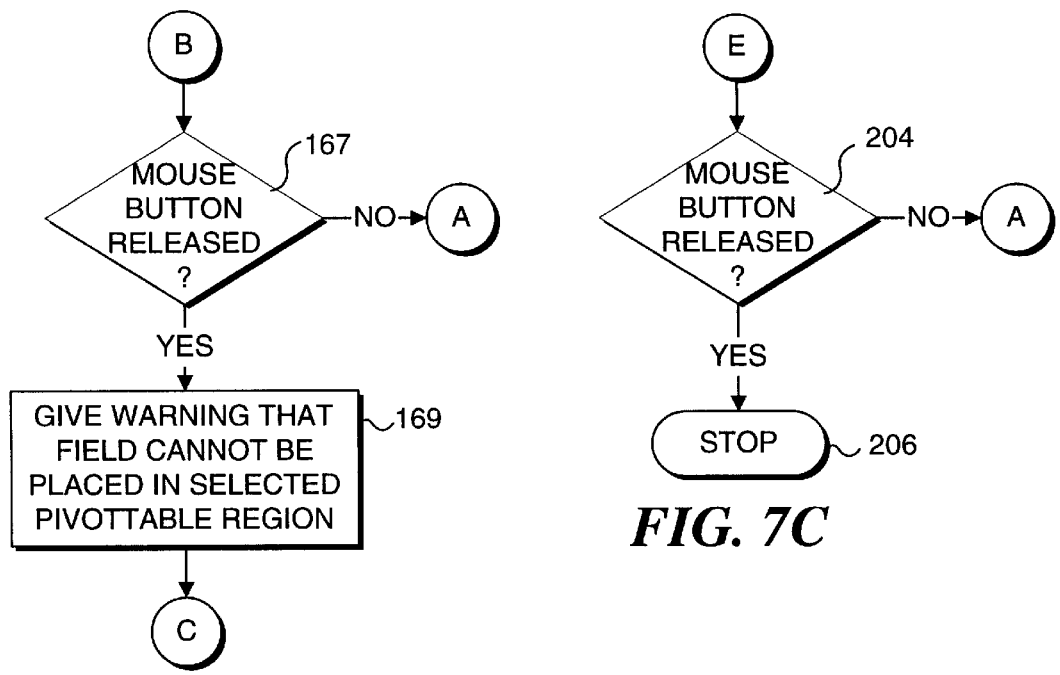
FIG. 7B
FIG. 7C
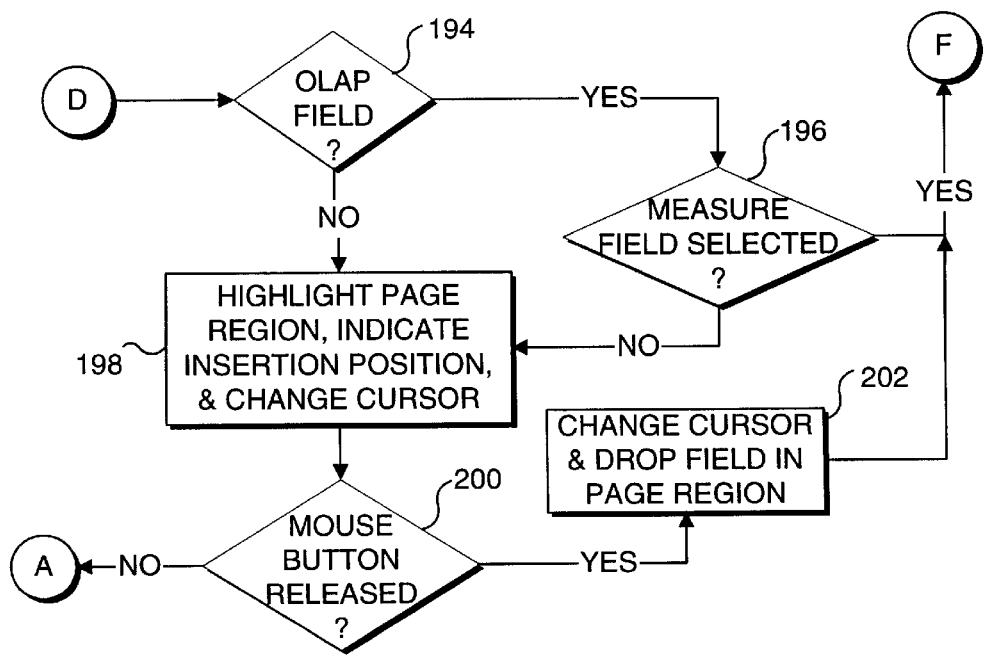
FIG. 7D

USER INTERFACE FOR CREATING A SPREADSHEET PIVOTTABLE

FIELD OF THE INVENTION

The present invention generally relates to a user interface for a spreadsheet program, and more specifically, to an intuitive interface that facilitates the creation of a crosstab data table to display data within a spreadsheet program.

BACKGROUND OF THE INVENTION

Crosstab data tables designated as PivotTable™ data displays have been provided in Microsoft Corporation's EXCEL™ spreadsheet program for several years. (PivotTable is a trademark of Microsoft Corporation.) A PivotTable data display is a type of crosstab data table and provides an efficient way to display and summarize data that are supplied by a database program or which are in a data listing of a spreadsheet. A user can select fields of the data to include within page, row, column, or data regions of the PivotTable data display and can choose parameters such as the sum, variance, count, and standard deviation to be displayed for selected data fields. Relatively structured spreadsheets that already have subtotals, data entry cells, and summaries of fields are generally not appropriately expressed using a PivotTable data display. However, any data in a database that can be queried from within a spreadsheet program,. or spreadsheet data comprising lists that are not already organized to include sums and other calculated values are ideal candidates for a PivotTable data display.

Users of the prior art EXCEL spreadsheet program who have attempted to apply a PivotTable data display to data have been frustrated by difficulties they have experienced. The most recent prior art version of the EXCEL spreadsheet program (EXCEL 97) includes a PivotTable Wizard that can be used to create a PivotTable data display in four steps. While the four steps used by the Wizard to create a PivotTable data display seemed simple enough, users have not found it intuitive to make changes to a PivotTable data display after it has been produced with the assistance of the Wizard. In fact, changes to a PivotTable data display could most easily be made in this prior art program by again opening the PivotTable Wizard. The PivotTable Wizard of this prior EXCEL spreadsheet program employs a modal drag-and-drop dialog representation of a PivotTable data display to enable a user to select the fields to be included in regions of the PivotTable data display. However, the dialog that includes this drag-and-drop representation is not accessible until the PivotTable Wizard is invoked. It is not very intuitive to run the Wizard to access the drag-and-drop representation of the PivotTable data display in this prior art program.

It will be apparent that it would be preferable to enable users to produce and modify a PivotTable data display by dragging and dropping fields directly on a PivotTable data display on a spreadsheet, rather than in a modal dialog PivotTable representation. By providing direct access to the PivotTable data display for making drag-and-drop changes, it should be much clearer how a user might modify a PivotTable data display.

In addition, when dragging a field over a PivotTable data display, it would be useful to display an icon associated with the field that more clearly indicates the region of the PivotTable data display over which the field is then disposed that was available in the prior art. If the,user optionally can always access fields that can be dragged onto a spreadsheet PivotTable data display and can more readily determine the region over which the fields are disposed during the dragging process, much of the confusion of the prior art in regard to creating and modifying a PivotTable data display should be alleviated.

Certain types of data fields that can be used to create a PivotTable data display are of the "online analysis processing" (OLAP) type. OLAP data include field that can only be placed in the row, column, or page regions of a PivotTable data display and are referred to as "dimension" fields, and fields that can only be placed in the data region of a PivotTable data display and are thus referred to as "measure" fields. The prior art spreadsheet programs have not recognized OLAP data fields and have not indicated to the user the type of OLAP field, or the specific region in which such fields can be inserted. It would be preferable to provide a clear indication of whether fields are of the OLAP type and an indication of whether a specific field is a dimension or a measure field. Prohibitions against using dimension fields within the data region, or measure fields within any of the row, column, or page regions of a PivotTable data display should be enforced in such a way as to enable a user to understand where a field being dragged onto a PivotTable data display can be dropped.

SUMMARY OF THE INVENTION

In accord with the present invention, a method is defined for enabling a user to selectively produce and modify a spreadsheet PivotTable. data display using a specified set of data. The method includes the step of displaying an array of field buttons on a spreadsheet, each field button in the array representing a different field of the specified set of data. Predefined regions of the PivotTable data display are represented directly on the spreadsheet to facilitate enabling a user to graphically select a field button from the array, drag the field button that was selected over a region of the PivotTable data display on the spreadsheet in which the user desires to include a field represented by the field button that was selected, and drop the field button that was selected. When the user drops the field button, the field represented by the field button appears within the region in which the field button was dropped. The preceding steps are repeated for any of the fields represented by the field buttons that the user desires to include in the PivotTable data display. The PivotTable data display presented to the user thereby includes the fields within the regions in which the user dropped each field button.

The regions in which a field button can be dropped include a row region, a column region, a page region, and a data region. A user can change the PivotTable data display by graphically selecting a field button in the array, dragging the field button over the region of the PivotTable data display on the spreadsheet in which the user desires to include a field represented by the field button that was just selected, and dropping the field button that was selected, causing the field represented by that field button to be included within the region in which the field button was dropped. Similarly, a user can change the PivotTable data display by graphically selecting a field in the PivotTable data display, dragging a field button representing the field that was just selected either from the PivotTable data display, or over a different region of the PivotTable data display, and dropping the field. If the field button is dragged off the PivotTable .data display, the field represented by that field button is deleted from the PivotTable data display, and if the field button is dropped in a different region, the field represented by that field button is moved to the different region of the PivotTable data display.

A user can also change a position of a field in a region relative to another field in the region by dragging a field button representing the field to be changed to a different position in the same region. The relative positions are changed only if the region in which the field is dragged is a page region, a row region, or a column region.

The method also preferably includes the step of employing a cursor shape to clearly graphically indicate a region of the PivotTable data display over which a field button is currently being dragged. A shape of the cursor used to graphically select a field button is changed when a user selects the field button from the array. In addition, the method preferably includes the step of graphically highlighting a region of the PivotTable data display over which the field button is being dragged.

In one preferred form of the invention, the array remains visible at all times, unless closed by a user, to enable changes and additions to be made to the PivotTable data display. Icons are preferably included in the array to indicate a field type for data that comprise OLAP fields; the field type is either a dimension or a measure. A user is precluded from dropping a field button representing a dimension field into a data region on the PivotTable data display, or dropping a field button representing a measure field into either a page region, a row region, or a column region.

Another aspect of the present invention is directed to a computer-readable medium having computer-executable instructions for performing the steps of the method discussed above.

Still another aspect of the present invention is directed to a system that includes a memory in which machine instructions are stored, a display, and a processor coupled to the memory and the display. The processor implements the machine instructions to execute a spreadsheet program and carries out functions in response to the machine instructions that enable a user to create and modify a PivotTable data display generally as described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1A shows an exemplary data listing as it would appear in a portion of a spreadsheet;

FIG. 1B is an exemplary PivotTable data display created from the data of FIG. 1A with the present invention;

Figure 7A:
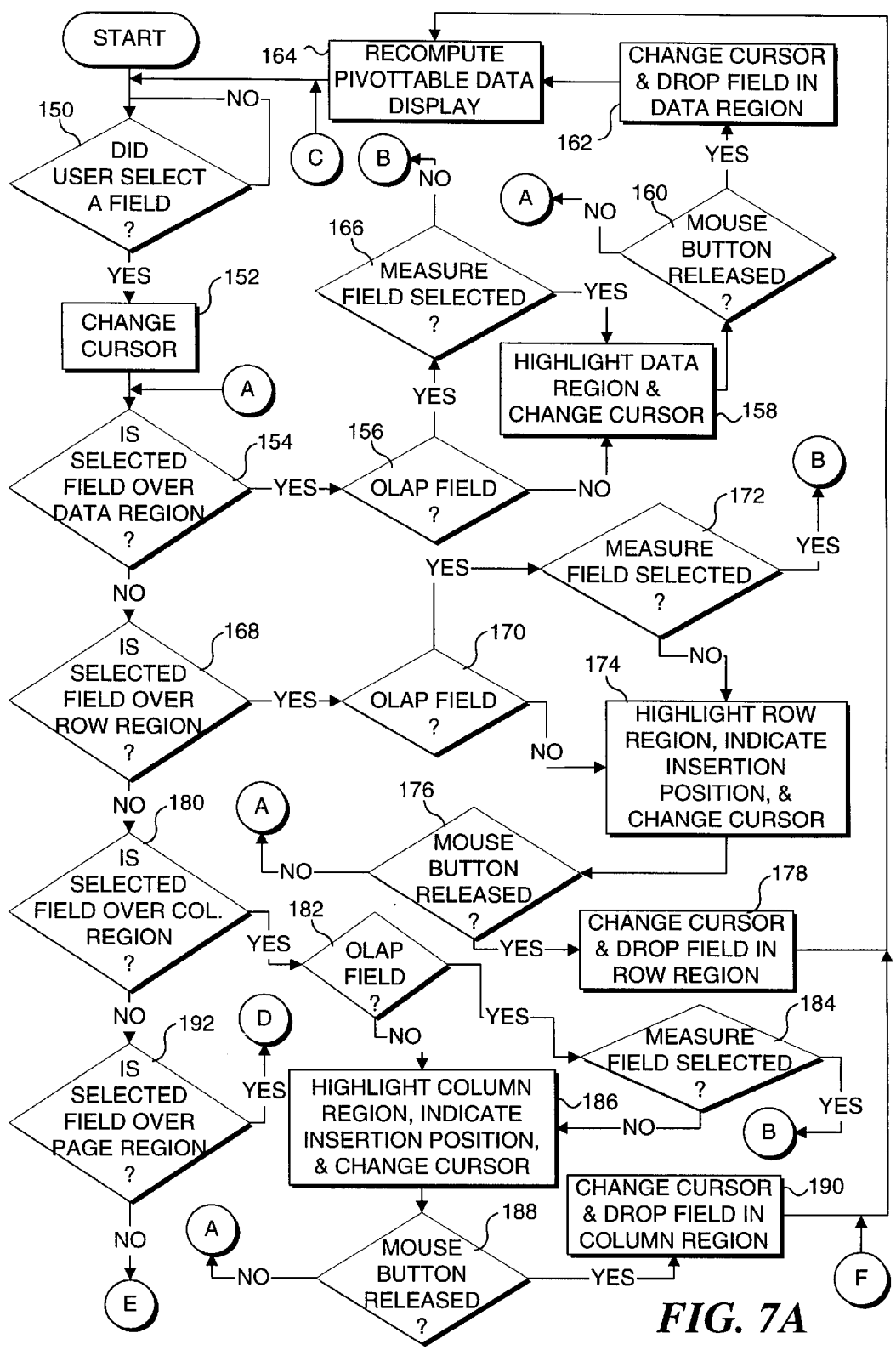
Figure 8:
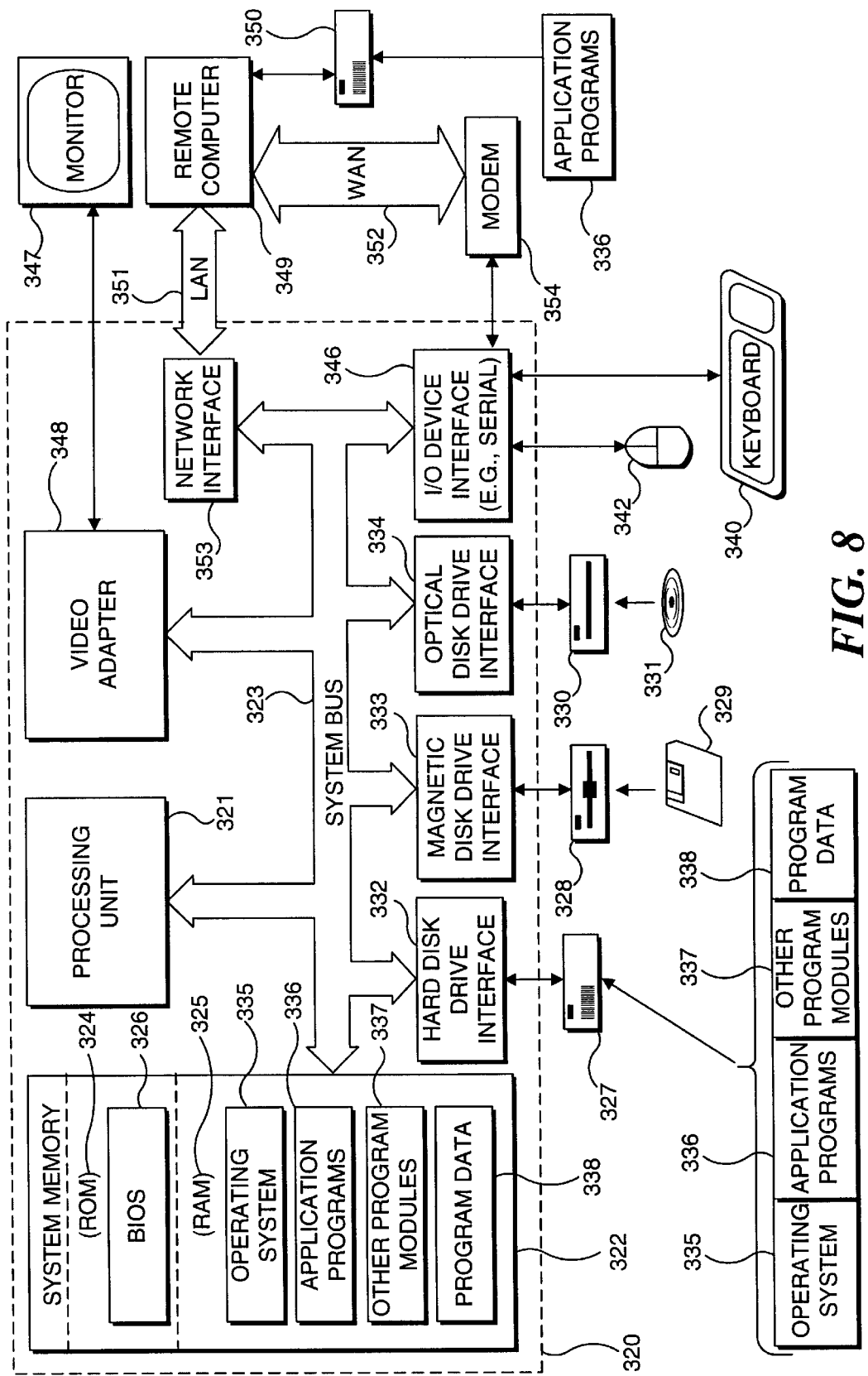

FIGS. 7A, 7B, 7C, and 7D are a flow chart illustrating the logic employed to produce a PivotTable data display using the drag-and-drop technique of the present invention; and FIG. 8 is a block diagram of a generally conventional computer that is usable in implementing the present invention.

DESCRIPTION OF THE PREFERRED EMBODIMENT

The preferred embodiment of the present invention will be implemented in Microsoft Corporation's EXCEL 2000™ spreadsheet program, which is part of the OFFICE 2000™ product line. This invention greatly facilitates the creation of a PivotTable data display from data that are imported either from a database program, or are tabulated in a spreadsheet listing using the spreadsheet program. The present invention facilitates the creation of a PivotTable data display from such data by providing a simple user interface that is more intuitive than that previously available for creating and modifying a PivotTable data display. This user interface also enables a PivotTable data display to be created directly on a spreadsheet and provides much more information to the user to facilitate changes in the PivotTable data display.

FIG. 1A includes an exemplary list of data 10 within a spreadsheet. As will be apparent, a conventional spreadsheet format for listing data includes numeric values 12 for identifying each row in the listing and alpha values 14 for identifying each of the columns. In row 1, the names of each of the fields of data included in the list are indicated. In exemplary list 10, the fields are: Country, Region, State, Product Line, Unit (type of product), Revenue, and Expenses. This exemplary list is not intended to in any way be limiting in regard to the present invention, but is simply provided for purposes of illustrating how the present invention is applied to produce a PivotTable data display from a simple list of data. Typically, a PivotTable data display is produced from data that do not include sums or other calculated values for any of the fields. One of the features of a PivotTable data display is its ability to automatically calculate various functions such as sums, variances, standard deviations, etc., from numeric values included within the fields of data to which the PivotTable data display is applied.

FIG. 1B illustrates a PivotTable data display 20 that has been created from the exemplary list of data in FIG. 1A. As shown in FIG. 1B, PivotTable data display 20 has been produced by inserting the data for the fields Country, Region, and State in a row region 22 of the PivotTable data display, and the field Product Line in a column region 24. In addition, the function for determining a sum of values has been applied to the fields Revenue and Expenses within a data region 26. Thus, when created, the PivotTable data display automatically displays the sum of Revenue and Expenses for the fields Clothes and Food, in regard to each State, each Region, and each Country. In addition, a grand total is provided in the right most column of the PivotTable data display and a total sum of Revenue and a total sum of Expenses is provided in the bottom two rows of PivotTable data display 20.

It will be understood that many other variations of a PivotTable data display can be created for the exemplary data by changing the fields selected, differently organizing the selected fields (e.g., changing the regions in which they are included, or changing their order in a region), and by selecting other functions to be calculated in the data region. One of the most powerful features of a PivotTable data display is its ability to organize the display of data in many different ways, depending upon choices made by the user in creating the PivotTable data display and in selecting the functions that it will display.

To create PivotTable data display 20 from exemplary data list 10 using a preferred embodiment of the present invention, the user selects a menu item labeled "Data," causing a drop-down list to be displayed that includes an option entitled "PivotTable and Pivot Chart Report . . . " If the user then selects this option, a PivotTable and pivot chart wizard opens at Step 1, wherein a dialog offers the user the option of selecting the data type that will be analyzed. The options listed include (1) "Microsoft EXCEL list or database;" (2) "External data source;" (3) "multiple consolidation ranges;" and (4) "another PivotTable or Pivot Chart." In addition, the user is given the option of selecting the kind of report that will be created by choosing either "PivotTable," or "Pivot Chart (with PivotTable)."

Figure 2:
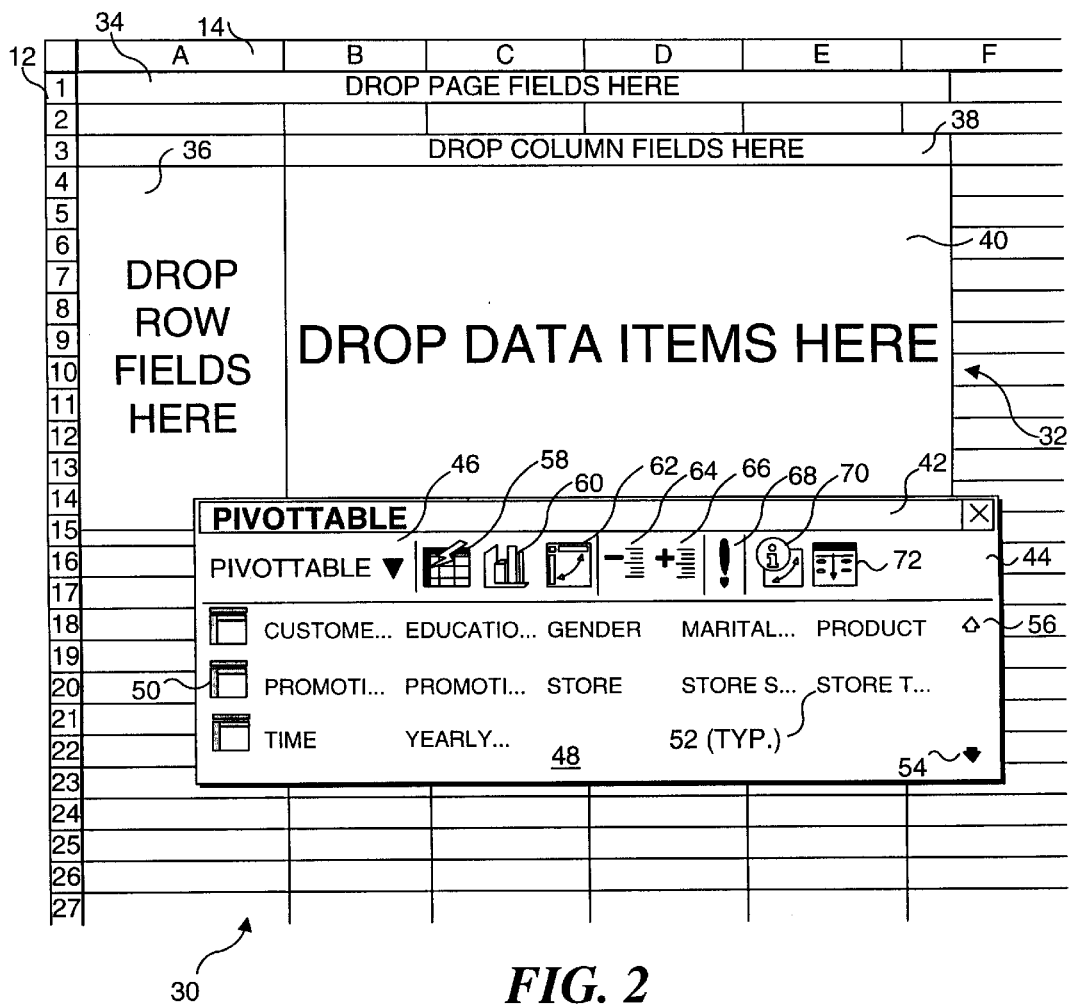
FIG. 2 is an illustration of a portion of a spreadsheet in which a "field well" that includes an array of fields is displayed for use in creating a PivotTable data display by dragging and dropping fields into selected regions of a PivotTable data display, in accord with one preferred embodiment of the present invention.

In Step 2, assuming that the user has indicated that a Microsoft EXCEL list or database will be used as the source, the user is provided an option for entering a range of data, e.g., from an EXCEL spreadsheet. The simplest technique for entering the range from an open spreadsheet is to place the cursor on the cell at one extreme corner of the range and drag the cursor to the diagonally opposite corner of the range, with the selection button on the mouse or other pointing device depressed; all of the cells encompassed between the two diagonally opposite corner cells will be highlighted. The range of cells thus selected is entered into the dialog box opened during Step 2, for example, as "data!$A$1:G$33," indicating a range specified by the diagonally opposite corner cells A1-G33. If the user then chooses "Next Step," a new dialog box opens, giving the user the option of putting the PivotTable data display on either a new worksheet or within an existing worksheet. The new dialog box includes additional options that are not particularly pertinent to the present invention and therefor will not be discussed herein. If the user selects a control button labeled "Finish," and has chosen to place the PivotTable data display on a new worksheet, a drag-and-drop form 30 is opened on a new worksheet, as shown in FIG. 2. It should be noted that if the user has selected an existing worksheet, the drag-and-drop form is opened on the existing worksheet, with its upper left corner disposed in a cell selected by the user.

Figure 3:
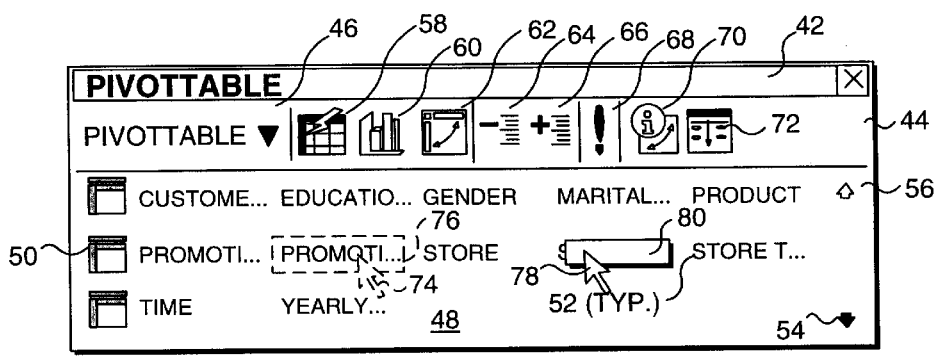
FIG. 3 illustrates the field well of FIG. 2 and indicates how a cursor changes when a field is selected to be dragged.

With reference to FIG. 2, drag-and-drop form 30, which appears directly on the spreadsheet, initially includes a region layout diagram 32 that identifies the four regions of a PivotTable data display in which the user may insert fields from the selected data. At the top of the drag-and-drop form is a page region 34. On the left side of the drag-and-drop form is a row region 36 and to the right and above the row region is a column region 38. A data region 40 is included to the right of the row region and below the column region. Also displayed adjacent drag-and-drop form 30 is a PivotTable Button Bar 42 for creating the PivotTable data display. When the drag-and-drop form is active, a field well 48 is provided below PivotTable Button Bar 42 and lists all of the fields of the data previously selected by the user for use in creating the PivotTable data display. Field well 48 and PivotTable Button Bar 42 are also illustrated in FIG. 3. The PivotTable Button Bar includes buttons 44 and a drop-down list box 46, which lists various options that can be selected by the user to carry out functions related to the PivotTable data display. Several of these functions in the drop-down list are replicated in buttons 44. Included within the buttons are a button 58, which enables the user to format a report using the PivotTable data display, a button 60, which brings up the chart wizard, for creating a chart from the PivotTable data display, and a button 62, which invokes the PivotTable Wizard. Buttons 64 and 66 respectfully enable a user to hide detail or show detail for a field or item that has been selected within the PivotTable data display. A button 68 refreshes the data in the PivotTable data display once changes have been introduced in the source data for the PivotTable data display. A button 70 enables the user to choose settings for a field selected within the PivotTable data display by opening a dialog in which the various functions that can be calculated for the data region are listed and which also lists other options related to the PivotTable data display. Finally, a button 72 enables a user to selectively toggle between indicating the regions in which fields from field well 48 can be inserted, or not indicating these regions.

In the example shown in FIGS. 2 and 3, field well 48 lists OLAP entities or fields and thus includes icons 50 to indicate whether the fields listed to the right of each icon are of the dimension type or of the measure type. Icon 50 looks like a small representation of a PivotTable data display and includes rectangles for each of the four regions of a PivotTable data display. Fields that are of the dimension type are indicated by highlighting each of the page, row, and column regions of icon 50 to indicate that any of the fields in the row to the right of the icon can be selected and inserted within any of these three regions. Although not shown in FIGS. 2 and 3, any row in which fields that are of the measure type is identified by an icon having the data region highlighted to indicate that the fields in the row to the right of such an icon can be dropped within the data region of a PivotTable data display.

To create a PivotTable data display, pivot form 30 enables a user to select fields within pivot field well 48 using a cursor controlled by a mouse or other pointing device (not shown). As indicated by an arrow cursor 74 in FIG. 3, when the cursor is positioned over one of the fields listed within field well 48, the selected field is highlighted as indicated by a dash line rectangle 76. If the user then pushes the selection button on the mouse or other pointing device being used, the cursor changes to include not only an arrow 78, but also a field button 80 that represents the selected field.

As laid out in the preferred embodiment, field well 48 displays up to three rows of fields 52 at a time, with up to five fields in a row. If the fields are of the OLAP type, rows of dimension fields are listed first, followed by rows of measure fields. Any row having less than five fields is displayed as the last row of a particular type, i.e., either as a row of dimension fields or measure fields, and rows of the dimension fields are followed by rows of the measure fields for OLAP type data.

A down pointing arrow 54 is shown as black to indicate that additional fields can be displayed by scrolling down, e.g., by selecting down arrow 54. In the example shown in FIG. 3, an up arrow 56 is grayed, to indicate that the top row of fields is already being displayed. Each time that one of the up or down arrows is selected, the list scrolls by no more than two rows in the selected direction. If all of the fields of the data selected to produce a PivotTable data display fit within three rows, both down arrow 54 and up arrow 56 are grayed.

Figure 4A:
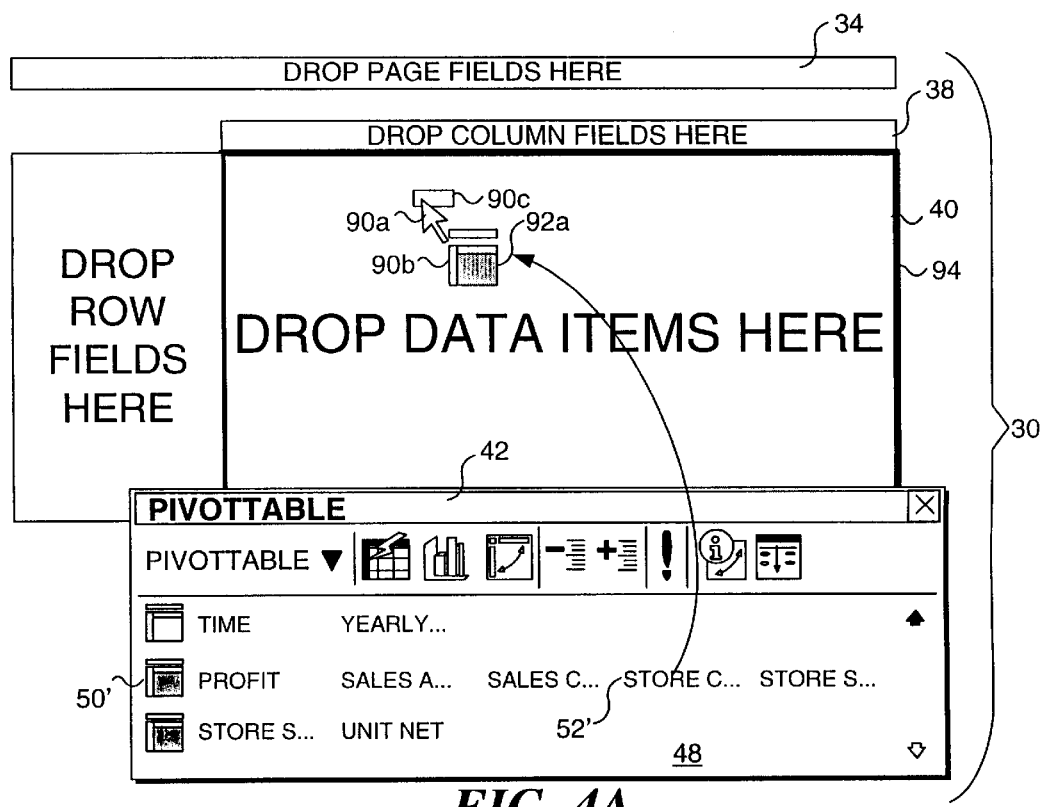
FIG. 4A illustrates the field well and PivotTable data display of FIG. 2, and shows a change in the cursor as a selected field of the OLAP type, i.e., a measure entity, is dragged over the data region of the PivotTable data display.
Figure 4B:
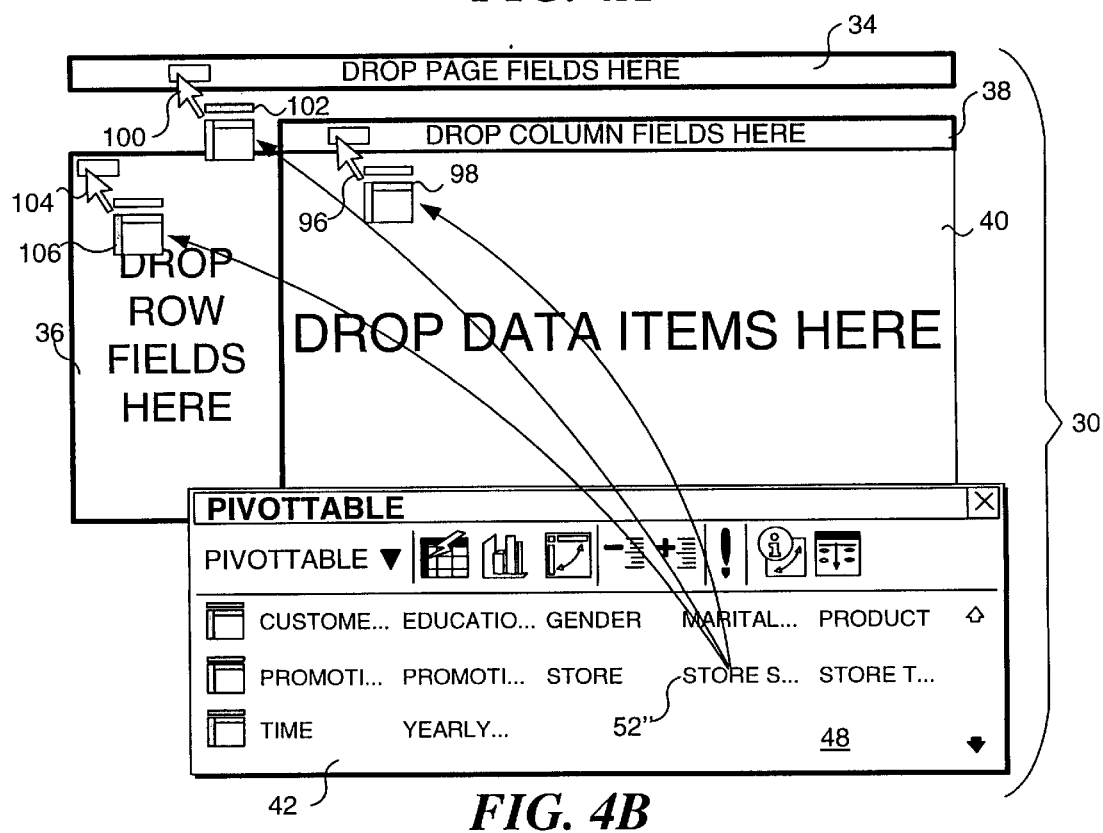
FIG. 4B illustrates the field well and PivotTable data display of FIG. 2, showing how the cursor changes as a dimension entity is dragged over the column region, page region, and row region of the PivotTable data display.

Once the user has selected a field as indicated by the change in the shape of the cursor as described above, the user can then drag the selected field button onto a chosen region within drag-and-drop form 30, which appears directly on the spreadsheet. This step is illustrated in FIGS. 4A and 4B. In FIG. 4A, the user has selected a field 52' labeled "STORE C . . . " (i.e., store cost), and keeping the selection button on the mouse or other pointing device depressed, has dragged the cursor over data region 40. Once the cursor passes over data region 40, its shape again changes to include a cursor arrow 90a, and a representation 90b of the four regions of the PivotTable data display. A control button 90c then becomes substantially smaller, and its position indicates the insertion point for the selected field represented by field button 90c. In addition, representation 90b of the four regions includes a highlighted data region 92a, indicating that the cursor is currently over data region 40 of the actual PivotTable data display on drag-and-drop form 30. In addition, while the cursor is over it, data region 40 is highlighted by changing the color of its outline indicated by a line 94. If the user then releases the selection button on the mouse or pointing device, the selected field that was dragged into the data region is inserted into that region. It should be noted that since STORE COST is a measure type field, as indicated by an icon 50' disposed at the left side of the row in which the selected field is located, since icon 50' includes a highlighted data region. Any attempt by the user to drop a measure field within any of the page, row, or column regions will be precluded. When the field button representing field 52' is dragged over one these three regions, cursor 78 retains the look that it has in FIG. 3, and includes only the cursor arrow and relatively larger field button 80.

In FIG. 4B, the user has selected a field 52" identified as "STORE S . . . " (for store sales), which is a dimension type field and is able to drag the selected field represented by its field button onto any of page region 34, row region 36, or column region 38. It will be noted that when field 52" is dragged into column region 38, a cursor 96 is displayed that includes a highlighted column region 98 in a representation of the PivotTable data display. Similarly, when field 52" is dragged over row region 36, a cursor 104 is displayed that includes a representation of the PivotTable data display having a highlighted row region 106. If the selected field is dragged over page region 34, a cursor 100 is displayed that includes a highlighted page region 102 in the representation of the PivotTable data display. A highlighted "I" bar indicates an insertion point for any field currently being dragged over any of the page, row, or column regions in which one or more fields has already been included. Each field dropped into the data region is simply added at the end of any other fields currently included therein, and there is no indication of the insertion point in the data region. Once at least one field has been dropped into any of the page, row, or column regions, and a field is then dropped into the data region, the PivotTable data display automatically computes the function(s) selected for the field dropped into the data region, so that the PivotTable data display is presented with the fields thus selected. Any empty regions are still indicated in drag-and-drop form 30, but the display of these regions can be selectively toggled off with button 72. If a user changes the active element to a cell outside the PivotTable data display, field well 48 is not displayed under PivotTable Button Bar 42, but can be redisplayed simply by selecting any cell within the PivotTable data display. If the user closes Pivot-Table Button Bar 42, it can be reopened by "right clicking" in the main button bar area of the spreadsheet program and selecting "PivotTable" from the list of available button tool bars.

It should be noted that the user can select any field within the page, row, or column regions (but not within, the data region) of the PivotTable data display and drag it from the PivotTable data display, dropping it anywhere on the spreadsheet that is outside the PivotTable data display, to remove the selected field from the PivotTable data display. A field in one region of the PivotTable data display can be selected with the mouse or other pointing device controlled cursor, dragged into a different region of the PivotTable data display, and released to drop the field, thereby moving the field into the different region. Since the cursor changes to include a highlighted area indicating the region over which the field has been dragged, it is readily apparent over which region the field is at any time. It is also possible to reorder any fields within the page, row, or column regions by selecting one of the fields with the cursor using the mouse or other pointing device, dragging it to change its insertion point to a different position, and dropping the field at the different position. The graphic display of the insertion point and the cursor shape change to indicate the region over which a field is being dragged avoid most of the problems encountered with changing an existing PivotTable data display in the prior art.

Figure 5:
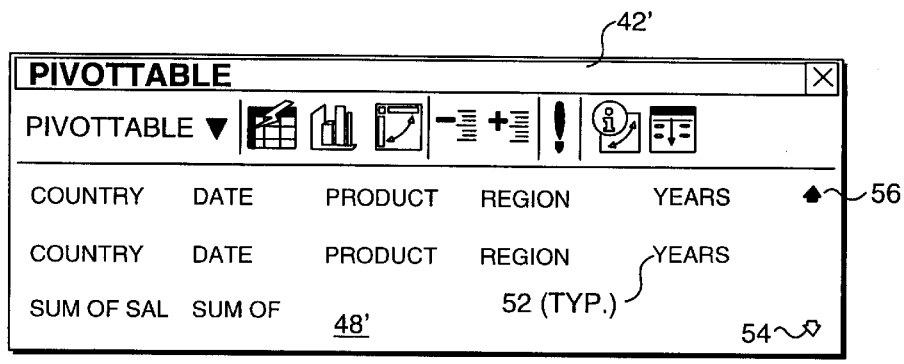
FIG. 5 illustrates an exemplary field well in which non-OLAP fields are included.

FIG. 5 illustrates a PivotTable Button Bar 42' that includes fields not of the OLAP type. In a field well 48', since none of the fields included therein are of the OLAP type, the icons used for indicating dimension fields and measure fields are omitted. In all other respects, field well 48' operates as described above in regard to field well 48, and enables a user to drag-and-drop fields onto a PivotTable region where the user intends to insert the field. However, for non-OLAP type fields, there are no restrictions as to where any of the fields can be inserted by the user. Field well 48' lists fields 52 that correspond to the fields in FIG. 1A used to create PivotTable data display 20 in FIG. 1B.

Figure 6:
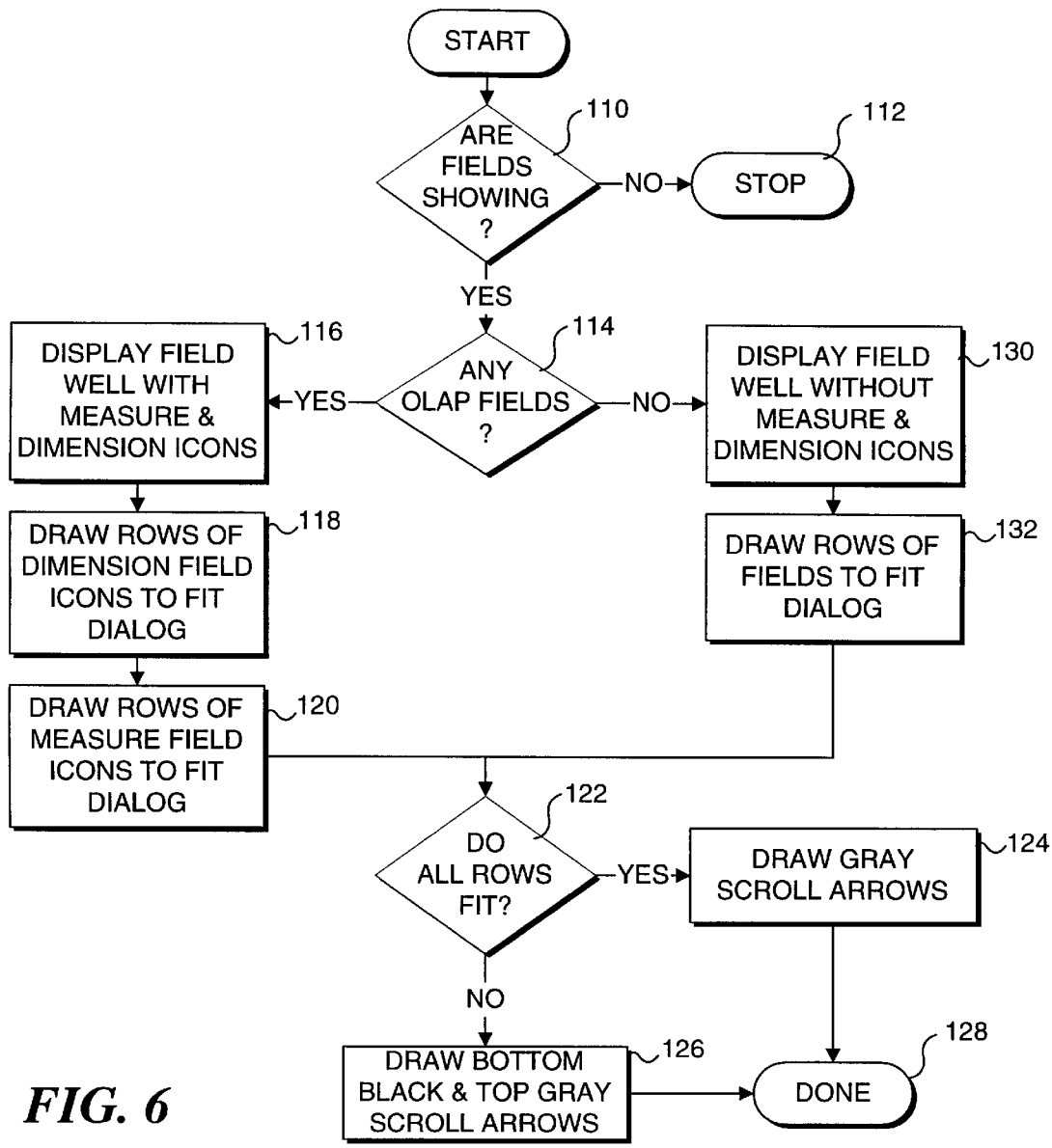
FIG. 6 is a flow chart showing the logic employed when displaying the field well to a user.

In FIG. 6, the steps implemented for displaying fields within a field well are illustrated. Beginning at a start block, the logic proceeds to a decision block 110, which determines if any fields are showing within the field well. If not, it is probable that the user has incorrectly selected the source of the data to be used to generate a PivotTable data display and the program concludes at a stop block 112. However, if fields are showing, the logic proceeds to a decision block 114. In this decision block, a check is made to determine if any of the fields are of the OLAP type. If so, a block 116 provides for displaying the field well with both measure and dimension icons, at the left side of the field well, adjacent rows in which corresponding measure and dimension are listed.

In a block 118, the logic provides for drawing the rows of dimension field icons to fit the dialog box used for the field well. As explained above, the field well is arranged with up to three rows of up to five fields, and the dimension fields precede the measure fields for OLAP type data. Accordingly, block 118 provides for drawing the rows of dimension fields to fit within this context. Similarly, a block 120 provides for drawing rows of measure field icons to fit within the field well, as explained above.

A decision block 122 determines if all rows fit within the dialog box display, which in the preferred embodiment only includes three rows of fields. If so, a block 124 provides for drawing both up and down arrows (for scrolling) as gray, indicating that neither is needed, because all of the data is shown without the need to scroll up or down. Even if not needed, the up and down arrows are still displayed within the field well in this preferred embodiment. Alternatively, if all the rows do not fit within the three rows displayed at one time, a block 126 provides for drawing at least the up or down arrows for scrolling as black, depending upon the context of the displayed rows. For example, if the middle three rows of a total of five rows of fields are displayed, both the up and down arrows for scrolling will be black. However, if the top row of fields is already displayed, in this example, only the down arrow would be black. Following either blocks 124 or 126, the logic concludes in a block 128.

Referring back to decision block 114, if none of the fields are of the OLAP type, a block 130 provides for displaying the field well without measure and dimension icons. In a block 132, the rows of fields are drawn to fit the three row by five field layout used for displaying fields in this preferred embodiment. The logic then continues with decision block 122 as described above.

FIGS. 7A–7C disclose the logic applied in inserting fields within the regions of the PivotTable data display using drag and drop to generate a PivotTable data display directly on a spreadsheet, generally as described above. With reference to FIG. 7A, a decision block 150, which follows the start of the logic, determines if the user has selected a field. If not, the logic continues looping until a user selects a field with a mouse or other pointing device controlled cursor as described above. Once a field has been selected, a block 152 provides for changing the shape of the cursor that is displayed. As noted above, the cursor changes to include a field button until it is over one of the regions on the drag-and-drop form in which the selected field can be dropped. Thereafter, it changes so as to indicate the region over which the field has been dragged.

A decision block 154 determines if the selected field is over the data region and if so, a decision block 156 determines if the field being dragged is of the OLAP type. If not, the data region is highlighted on the drag-and-drop form and the cursor changes to indicate that the field is over the data region by highlighting that region within the cursor representation of a PivotTable data display. A decision block 160 determines if the user has released the mouse button (or other pointing device control) and if not, the logic returns to decision block 154. However, if the mouse or other control button has been released, a block 162 provides for changing the cursor shape back to its normal state after dropping the selected field within the data region. Thereafter, a block 164 re-computes the PivotTable data display to include the field that has been dropped onto the pivot form within the selected region. The logic then proceeds back to decision block 150.

Returning to decision block 156, if the user has selected an OLAP type field, a decision block 166 determines if a measure field has been selected and if so, the logic proceeds with block 158. If not, the logic proceeds to a decision block 167, which is shown in FIG. 7B. Decision block 167 determines if the mouse button (or other pointing device control) has been released, and if not returns to decision block 154 (in FIG. 7A). However, if the response to the determination in decision block 167 is affirmative, in a block 169, the logic provides for warning the user that the field being dragged cannot be dropped within the PivotTable region, as just attempted. The logic then returns to the start, beginning again with decision block 150.

A negative response to decision block 154, indicating that the selected field is not over the data region, leads to a decision block 168. In this decision block, the logic determines if the selected field is over the row region of the drag-and-drop form and if so, a decision block 170 determines if the selected field is of the OLAP type. An affirmative response to this last inquiry leads to a decision block 172, which determines if a measure field was selected and if so, proceeds to decision block 167 (FIG. 7B), which is described above.

A negative response to decision block 172, indicating that a dimension type OLAP field had been selected, leads to a block 174, as does a negative response to decision block 170. In block 174, the row region is highlighted and also, when one or more fields are already present in the row region, an insertion position is indicated where the selected field will be inserted if the user releases the mouse or other control button. In addition, the cursor changes to highlight the row region of the PivotTable representation included in the cursor. Following block 174, the logic proceeds to a decision block 176 to determine if the mouse or other pointing device control button has been released. If not, the logic returns to decision block 154. However, if the button has been released, a block 178 provides for changing the cursor to its normal state and dropping the selected field within the row region at the insertion point chosen by the user through graphical manipulation of the cursor prior to release of the control button. Thereafter, the logic again returns to block 164.

A negative response to decision block 168 leads to a decision block 180 to determine if the selected field has been positioned by the user over the column region. If so, a decision block 182 determines if the selected field is of the OLAP type. A positive response to decision block 182 leads to a decision block 184, which determines if a measure field has been selected. If so, the logic proceeds with decision block 167 (FIG. 7B), which is described above, but if not, proceeds to a block 186. Block 186 is also reached following a negative response to decision block 182. In block 186, the logic highlights the column region, indicating an insertion position for the selected field based on the positioning of the cursor by the user (and assuming that one or more fields are already present in the column region), and changing the cursor to indicate a highlighted column region in the PivotTable representation of the cursor. Thereafter, a decision block 188 determines if the mouse button has been released and if so, a block 190 changes the cursor to its normal state and drops the selected field within the column region at the insertion point selected by the user. Thereafter, the logic returns to block 164. A negative response to decision block 188 leads back to decision block 154.

If a negative response is achieved from decision block 180, a decision block 192 determines if the selected field is over the page region. If so, the logic proceeds to a decision block 194 (in FIG. 7D), which determines if the selected field is of the OLAP type. An affirmative response in decision block 194 advances to a decision block 196, which determines if a measure field was selected and if so, proceeds back to block 164 (FIG. 7A). A negative response to either decision blocks 194 or 196 leads to a block 198. In block 198, the logic highlights the page region on the drag-and-drop form, indicates the insertion position, and changes the cursor so that the page region in the PivotTable representation of the cursor is highlighted. Thereafter, a decision block 200 determines if the mouse or other pointing device selection has been released and if not, the logic returns to decision block 154 (FIG. 7A). However, if the control button has been released, a block 202 provides for changing the cursor back to its normal representation and dropping the selected field within the page region of the drag-and-drop form. Thereafter, the logic then returns to block 164 (FIG. 7A).

Referring to decision block 192 in FIG. 7A, if a negative response is obtained, the logic proceeds with a decision block 204 in FIG. 7C. In decision block 204, the logic determines if the mouse or other device control button has been released and if so, the logic terminates in a block 206; otherwise, the logic proceeds back to decision block 154 (FIG. 7A).

Exemplary Computer System for Implementing the Present Invention

With reference to FIG. 8, an exemplary computer system for implementing the invention includes a general purpose computing device in the form of a conventional personal computer 320, including a processing unit 321, a system memory 322, and a system bus 323 that couples various system components including the system memory to processing unit 321. System bus 323 may be any of several types of bus structures including a memory bus or memory controller, a peripheral bus, and a local bus using any of a variety of bus architectures. The system memory includes a read only memory (ROM) 324 and random access memory (RAM) 325. A basic input/output system (BIOS) 326, containing the basic routines that helps to transfer information between elements within personal computer 320, such as during start-up, is stored in ROM 324. Personal computer 320 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD-ROM or other optical media. Hard disk drive 327, magnetic disk drive 328, and optical disk drive 330 are connected to system bus 323 by a hard disk drive interface 332, a magnetic disk drive interface 333, and an optical disk drive interface 334, respectively. The drives and their associated computer readable media provide nonvolatile storage of computer readable instructions, data structures, program modules, and other data for personal computer 320. Although the exemplary environment described herein employs hard disk 327, a removable magnetic disk 329, and a removable optical disk 331, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on hard disk 327, magnetic disk 329, optical disk 331, ROM 324, or RAM 325, including an operating system 335, one or more application programs 336, other program modules 337, and program data 338. A user may enter commands and information into personal computer 320 through input devices such as a keyboard 340 and a pointing device 342. Other input devices (not shown) may include a microphone, joystick, game pad, satellite dish, scanner, or the like. These and other input devices are often connected to processing unit 321 through a serial port interface 346 that is coupled to the system bus, but may be connected by other interfaces, such as a parallel port, game port, or a universal serial bus (USB). A monitor 347 or other type of display device is also connected to system bus 323 via an interface, such as a video adapter 348. In addition to the monitor, personal computers typically include other peripheral output devices (not shown), such as speakers and printers.

Personal computer 320 may operate in a networked environment using logical connections to one or more remote computers, such as a remote computer 349. Remote computer 349 may be another personal computer, a server, a router, a network PC, a peer device, or other common network node, and typically includes many or all of the elements described above relative to personal computer 320, although only a memory storage device 350 has been illustrated in FIG. 8. The logical connections depicted in FIG. 8 include a local area network (LAN) 351 and a wide area network (WAN) 352. Such networking environments are commonplace in offices, enterprise wide computer networks, intranets, and the Internet.

When used in a LAN networking environment, personal computer 320 is connected to local network 351 through a network interface or adapter 353. When used in a WAN networking environment, personal computer 320 typically includes a modem 354 or other means for establishing communications over WAN 352, such as the Internet. Modem 354, which may be internal or external, is connected to system bus 323 via serial port interface 346. In a networked environment, program modules depicted relative to personal computer 320, or portions thereof, may be stored in the remote memory storage device. It will be appreciated that the network connections shown are exemplary and other means of establishing a communications link between the computers may be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling a user to selectively produce and modify a spreadsheet PivotTable data display using a specified set of data, comprising the steps of:
   (a) displaying an array of field buttons on a spreadsheet, each field button in the array representing a different field from the specified set of data;
   (b) displaying predefined regions of the PivotTable data display directly on the spreadsheet;
   (c) enabling a user to:
      (i) graphically select a field button from the array;
      (ii) drag the field button that was selected over a region of the PivotTable data display on the spreadsheet in which the user desires to include a field represented by said field button that was selected;
      (iii) drop the field button that was selected, causing the field represented by said field button to be included within the region in which the field button was dropped; and
      (iv) repeating steps (i) through (iii) for any of the fields represented by the field buttons that the user desires to include in the PivotTable data display; and
   (d) displaying the PivotTable data display with the fields disposed in the regions in which the user dropped each field button.

2. The method of claim 1, wherein the regions in which the field button can be dropped include a row region, a column region, a page region, and a data region.

3. The method of claim 1, further comprising the step of enabling a user to change the PivotTable data display by graphically selecting a field button in the array, dragging the field button over the region of the PivotTable data display on the spreadsheet in which the user desires to include a field represented by said field button that was just selected, and dropping the field button that was selected, causing the field represented by said field button to be included within the region in which the field button was dropped.

4. The method of claim 1, further comprising the step of enabling a user to change the PivotTable data display by graphically selecting a field in the PivotTable data display, dragging a field button representing the field that was just selected either from the PivotTable data display, or over a different region of the PivotTable data display, and dropping the field, wherein if the field button is dragged from the PivotTable data display, the field represented by said field button is deleted from the PivotTable data display, and if the field button is dropped in a different region, the field represented by said field button is moved to the different region of the PivotTable data display.

5. The method of claim 1, further comprising the step of enabling a user to change a position of a field in a region relative to another field in the region by dragging a field button representing said field to a different position in the same region.

6. The method of claim 5, wherein the relative positions are changed only if the region in which the field is dragged is one of a page region, a row region, and a column region.

7. The method of claim 1, further comprising the step of employing a cursor shape to graphically indicate a region of the PivotTable data display over which a field button is currently being dragged.

8. The method of claim 1, further comprising the step of changing a shape of a cursor used to graphically select a field button when a user selects the field button from the array.

9. The method of claim 1, further comprising the step of graphically highlighting a region of the PivotTable data display over which the field button is being dragged.

10. The method of claim 1, wherein the array remains visible at all times, unless closed by a user, to enable changes and additions to be made to the PivotTable data display.

11. The method of claim 1, further comprising the step of including icons that indicate a field type for data that comprise online analysis processing (OLAP) fields, said field type being one of a dimension field type and a measure field type.

12. The method of claim 11, further comprising the steps of precluding a user from dropping a field button representing a dimension field into a data region on the PivotTable data display; and precluding a user from dropping a field button representing a measure field into any of a page region, a row region, and a column region of the PivotTable data display.

13. A computer-readable medium having computer-executable instructions for performing the steps recited in claim 1.

14. A computer-readable medium having computer-executable instructions for performing the steps recited in claim 10.

15. A system for enabling a user to selectively produce and modify a spreadsheet PivotTable data display using a specified set of data, comprising:
(a) a memory in which a plurality of machine instructions are stored;
(b) a display on which graphics and text are displayed to a user;
(c) a user input device that enables a user to graphically select an element shown on the display; and
(d) a processor coupled to the memory, the user input device, and the display, said processor executing the plurality of machine instructions to implement a spreadsheet program that includes the functions of:
(i) displaying an array of field buttons on a spreadsheet on the display, each field button in the array representing a different field from the specified set of data;
(ii) displaying predefined regions of the PivotTable data display directly on the spreadsheet on the display;
(iii) enabling a user to:
(1) graphically select a field button from the array with the user input device;
(2) employ the user input device to drag the field button that was selected over a region of the PivotTable data display on the spreadsheet in which the user desires to include a field represented by said field button that was selected;
(3) drop the field button that was selected with the user input device, causing the field represented by said field button to be included within the region in which the field button was dropped on the display; and
(4) repeating steps (1) through (3) for any of the fields represented by the field buttons that the user desires to include in the PivotTable data display; and
(iv) presenting the PivotTable data display on the display with the fields disposed in the regions in which the user dropped each field button.

16. The system of claim 15, wherein the regions in which the field button can be dropped in the spreadsheet shown on the display include a row region, a column region, a page region, and a data region.

17. The system of claim 15, wherein the functions implemented by the processor further include enabling a user to change the PivotTable data display by graphically selecting a field button in the array, dragging the field button over the region of the PivotTable data display on the spreadsheet in which the user desires to include a field represented by said field button that was just selected, and dropping the field button that was selected, causing the field represented by said field button to be included within the region in which the field button was dropped.

18. The system of claim 15, enabling a user to change the PivotTable data display by graphically selecting a field in the PivotTable data display with the user input device, dragging a field button representing the field that was just selected either from the PivotTable data display, or over a different region of the PivotTable data display with the user input device, and dropping the field, wherein if the field button is dragged from the PivotTable data display, the field represented by said field button is deleted from the PivotTable data display, and if the field button is dropped in a different region, the field represented by said field button is moved to the different region of the PivotTable data display.

19. The system of claim 15, wherein the functions implemented by the processor further include enabling a user to change a position of a field in a region relative to another field in the region by employing the user input device for dragging a field button representing said field to a different position in the same region.

20. The system of claim 19, wherein the relative positions are changed only if the region in which the field is dragged is one of a page region, a row region, and a column region.

21. The system of claim 15, wherein the functions implemented by the processor further include employing a cursor shape shown on the display to graphically indicate a region of the PivotTable data display over which a field button is currently being dragged.

22. The system of claim 15, wherein the functions implemented by the processor further include changing a shape of a cursor used to graphically select a field button as shown on the display, when a user selects the field button from the array with the user input device.

23. The system of claim 15, wherein the functions implemented by the processor further include graphically highlighting a region of the PivotTable data display over which the field button is being dragged with the user input device, as shown on the display.

24. The system of claim 15, wherein the array remains visible on the display at all times, unless closed by a user, to enable changes and additions to be made to the PivotTable data display.

25. The system of claim 15, wherein the functions implemented by the processor further include providing icons in the array shown on the display that indicate a field type for data comprising online analysis processing (OLAP) fields, said field type being one of a dimension field type and a measure field type.

26. The system of claim 25, wherein the functions implemented by the processor further include precluding a user from dropping a field button representing a dimension field into a data region on the PivotTable data display; and precluding a user from dropping a field button representing a measure field into any of a page region, a row region, and a column region of the PivotTable data display.

* * * * *